Patented Feb. 29, 1944

2,342,879

UNITED STATES PATENT OFFICE 2,342,879

DETOXICANT

Gustav J. Martin, Elmhurst, and Marvin R. Thompson, Great Neck, N. Y., assignors to William R. Warner & Company, Inc., New York, N. Y., a corporation of Delaware No Drawing. Application April 30, 1941
Serial No. 391,141

4 Claims. (Cl. 167—65)

This invention relates to therapeutic materials of lowered toxicity. More particularly, it relates to therapeutic agents comprising sulfathiazole in association with material lowering the toxicity thereof.

Sulfathiazole is a drug that is widely used in the treatment of diseases or infections caused by certain micro-organisms. The sulfathiazole is generally regarded as achieving its therapeutic effect by destroying or affecting the microorganism. The amount of the drug that may be administered in the treatment of the disease, however, is usually less than the amount that would obtain the maximum, or in many cases a sufficient or desirable, therapeutic effect. This limit is occasioned by the toxic action of the sulfathiazole on the human being or other animal to which it is administered. This is one of the principal difficulties involved in the administration of sulfathiazole. In many cases where the disease is advanced, the patient cannot tolerate a sufficient amount of the drug to check the action of the microorganisms. In other cases the tolerance of the patient is so low as to make it impossible to use an effective amount of the sulfathiazole and it therefore cannot be used as a therapeutic measure.

It is an object of our invention to provide a therapeutic agent comprising sulfathiazole which is non-toxic or of reduced toxicity and which can be administered in greater amounts in most cases, or at least in the usual amounts without an objectionable toxic effect on the human being or other animal being treated.

As is apparent from the above description, the sulfathiazole has two characteristics; one is its therapeutic effect achieved through its action on the micro-organisms and the other is its toxic effect resulting from the toxic action of the sulfathiazole on the animal body. It would be relatively simple to modify the sulfathiazole or its action so as to alter its toxicity as well as its therapeutic effect. However, to alter one of these characteristics without altering the other, i. e., to alter the toxicity without destroying the therapeutic effect is a most difficult problem.

The action and theory of detoxication has been appreciated heretofore, and in general, a detoxifying material is thought to combine or coact with the drug in such a manner as to mask the toxic characteristic while leaving unaltered the characteristic of the compound that is responsible for the therapeutic effect. But the exact action of various materials is little known, and the nature of detoxicants or their action with a particular drug so as not to affect its therapeutic action cannot be predicted from any available knowledge. Some drugs cannot be detoxified without reducing their therapeutic effect to an undesirable extent. As far as we are aware there is nothing in the prior art that indicates that sulfathiazole could be detoxified, nor that indicates what materials should be selected for even attempting to accomplish this result.

We have discovered that if an amino acid selected from the group consisting of cysteine and glycine or equivalent compounds is administered at the same time as the sulfathiazole, the toxic properties of sulfathiazole on the human system are eliminated or greatly reduced and minimized, but at the same time the therapeutic effect of the sulfathiazole is not appreciably interfered with. It is possible, therefore, to give a dosage of the sulfathiazole which is effective in its action against the micro-organisms without adversely affecting the patient.

Cysteine is slightly more effective than glycine, but each achieves a highly satisfactory detoxicant action with sulfathiazole. If desired, both may be used and the effect is somewhat superior to the action of either separately.

It is a further object of our invention therefore to provide a therapeutic agent comprising in combination sulfathiazole with cysteine or glycine or both and their equivalents, i. e., their precursors and biochemically related compounds.

In accordance with our invention, the sulfathiazole may be admixed in the desired proportions with the cysteine or glycine or both in either a dry mixture or in solution. This mixture may then be administered in the same way that sulfathiazole is normally administered, namely, orally, parenterally, rectally, etc. While the cysteine or glycine may be administered to the human body separately from the sulfathiazole, we find it more convenient to administer them as a mixture since this assures that the proper amount of both ingredients will be administered at the same time, and also eliminates the necessity for administering two drugs which would be less convenient and might give rise to misunderstanding as to the amount and nature of the administration.

Upon being taken into the body, the sulfathiazole and cysteine or glycine coact or react to produce a material having the non-toxic, therapeutic effect. If desired, the sulfathiazole and cysteine or glycine may be reacted in the laboratory in a manner similar to the action that takes place in the body in order to provide a single new compound which may be administered to produce the non-toxic therapeutic effect. Such compounds are hitherto unknown.

Cysteine or glycine may also be taken into the body in the form of precursors of biochemically related or equivalent compounds. For example, cysteine is readily obtainable from cystine. A comparison of the formula of cysteine

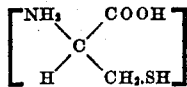

and cystine

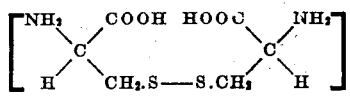

will show that cystine is essentially two molecules of cysteine linked through the mercapto groups, and that cysteine can be readily formed by the body from cystine. These two compounds may be regarded as equivalents for practicing the invention. In so far as cysteine or glycine are available from such equivalent materials, they are intended to be included within our invention.

The proportions of the materials are not critical, since cysteine and glycine may be taken into the body in relatively large amounts without any harmful action. The upper limit of the proportion of cysteine and glycine in our composition is therefore very high, although as a practical matter, in most instances, there is a maximum amount beyond which enhanced results are not obtained. Very small amounts of cysteine or glycine obtain improved results, and there is no minimum below which some improvement is not obtained. The proportions may also vary somewhat depending upon the tolerances and peculiarities of the patient with respect to the sulfathiazole. In general, however, we find a mixture comprising 1 to 50 parts of cysteine or glycine in admixture with 5 parts of sulfathiazole to be suitable in most instances. Satisfactory results are usually obtained when the mixture comprises equal parts.

It will be apparent that we have provided therapeutic material having superior and advantageous non-toxic properties, as described in the specification and following claims forming a part thereof.

We claim:

1. A therapeutic agent for use in connection with the treatment of diseases caused by micro-organisms, comprising sulfathiazole for combatting said micro-organisms and disease, in association with an amino acid selected from the group consisting of cysteine and glycine to lower the toxicity of said sulfathiazole without materially impairing the therapeutic effect thereof.

2. A therapeutic agent for use in connection with the treatment of diseases caused by micro-organisms, comprising sulfathiazole for combating said micro-organisms and disease, in association with cysteine to lower the toxicity of said sulfathiazole without materially impairing the therapeutic effect thereof.

3. A therapeutic agent for use in connection with the treatment of diseases caused by micro-organisms, comprising sulfathiazole for combating said micro-organisms and disease, in association with glycine to lower the toxicity of said sulfathiazole without materially impairing the therapeutic effect thereof.

4. A therapeutic agent for use in connection with the treatment of diseases caused by micro-organisms, comprising sulfathiazole for combating said micro-organisms and disease, in association with cysteine and glycine to lower the toxicity of said sulfathiazole without materially impairing the therapeutic effect thereof.

GUSTAV J. MARTIN.
MARVIN R. THOMPSON.